Feb. 17, 1970  G. J. TRAPP  3,495,561

SALVAGE APPARATUS

Filed April 10, 1968  2 Sheets-Sheet 2

INVENTOR.
George J. Trapp

United States Patent Office 3,495,561
Patented Feb. 17, 1970

3,495,561
SALVAGE APPARATUS
George Joseph Trapp, 105 Aylward Road, Merton Park, London, SW. 20, England
Filed Apr. 10, 1968, Ser. No. 720,032
Claims priority, application Great Britain, Apr. 12, 1967, 16,687/67
Int. Cl. B63b 35/44
U.S. Cl. 114—.5                                    5 Claims

ABSTRACT OF THE DISCLOSURE

Methods and apparatus for collecting oil or the like from the sea in which a floating boom made up of a number of buoyancy chambers flexibly coupled together is towed over the surface, each buoyancy chamber having an aperture, preferably slightly above the water level, through which the surface layer of oil (with a certain amount of water) enters an inner chamber within the buoyancy chamber, and the liquid in the inner chamber is drawn off through a pipe, passed through a centrifuge, the water is discharged and the oil is stored.

---

This invention relates to a method and apparatus for collecting waste light liquid, such as oil, from the surface of the sea or from other bodies of water.

The recent disaster to the ship "Torrey Canyon" has drawn attention to the great difficulties which may arise due to oil pollution when a very large quantity of oil is discharged on to the surface of the sea but, in fact, incidents of this kind, albeit on a smaller scale, are occurring continually. The principal object of the invention is to provide a method and apparatus by which the floating oil may be rapidly and efficiently collected, in such condition that it is suitable for salvage.

The broad principle of skimming unwanted material from the surface of a body of liquid, for example, dross from a bath of molten lead or excess fat from the surface of a pan of soup, is, of course, very old. Special problems arise, however, if the body of liquid is very large in extent, and it undulates and heaves as the surface of the sea will do. The object of the invention is to provide a method and apparatus by which the oil or other light liquid on the surface may be substantially completely drawn off with a minimum amount of the underlying sea water, so that it becomes a practical proposition to recover the oil or light liquid by means of centrifuging machinery.

In one aspect the invention consists of a method of collecting light liquid such as oil from the surface of the sea or other body of water comprising the steps of towing over the surface thereof a flexible floating boom made up of a number of buoyancy chambers flexibly coupled together, collecting the surface liquid by means of horizontal apertures contained in the buoyancy chamber, the apertures being located slightly above the water level so that the movement of the buoyancy chambers causes the light liquid to build up in front of the apertures until the light liquid and water runs into them, drawing the collected liquid from the buoyancy chambers, passing the collected liquid through centrifuging machinery, discharging the separated water back into the sea or other body of water, and storing the light liquid.

In another aspect the invention consists of apparatus for collecting light liquid, such as oil, from the surface of the sea or other body of water comprising a boom made up of a number of buoyancy chambers flexibly coupled together, the buoyancy chambers being each made up of an outer sealed chamber containing a horizontal slot connected by a duct to a sealed collecting chamber within the buoyancy chamber, the slot being located slightly above water level so that the light liquid will, due to the forward movement of the buoyancy chamber in use, build up in front of the slot until it overlaps it and flows with an amount of water through the duct into the collecting chamber, means for drawing the collected liquid from the collecting chamber, and means on each of the buoyancy chambers by which it may be towed.

The buoyancy chambers may be provided with shields at their front ends to prevent oil and water from washing over the tops of the buoyancy chambers.

To provide a ready understanding of the invention one embodiment thereof will now be described with reference to the accompanying diagrammatic drawings, in which—

Figure 1:
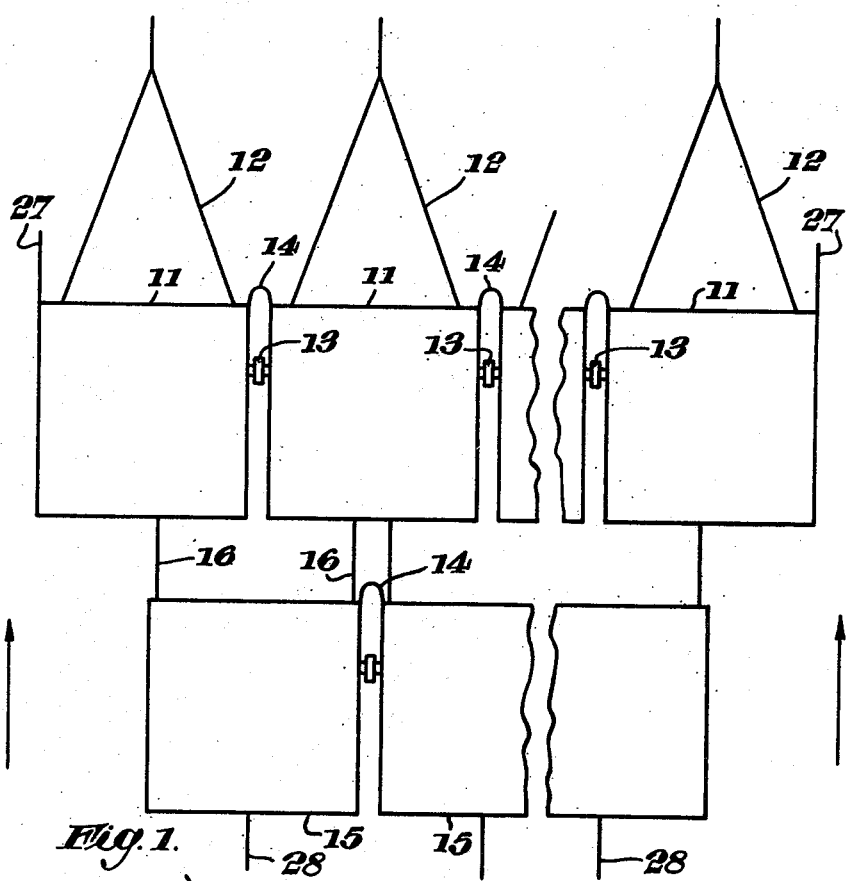
FIGURE 1 is a plan view of a part of boom containing nozzles for collecting oil and water.

FIGURE 1 is a plan view of part of a floating boom made up of a number of buoyancy chambers 11, each of which is provided with a tow line 12 to enable it to be towed. The buoyancy chambers are coupled together by means of couplings 13 which are so arranged that relative movement is allowed between the individual buoyancy chambers in all directions except the transverse direction which would allow the buoyancy chambers to vary their separation from each other. This is to allow the boom as a whole to conform to the undulations of the sea. Hinged or flexible shields 14 are coupled between the forward ends of the buoyancy chambers to reduce or prevent the escape of oil between them.

A second line of buoyancy chambers 15 lying behind the front line may be used if desired to ensure that any oil which does escape collection by the front line of buoyancy chambers is picked up, the second line being preferably arranged in staggered relation to the first line so that the centre of each buoyancy chamber 15 is behind the gap between two buoyancy chambers 11. The second line of buoyancy chambers is towed by means of cables 16. Control lines 28 are coupled to the rear ends of the buoyancy chambers of the second line but if this second line is not employed the control lines are coupled to the rear ends of the buoyancy chambers of the front line in place of the cables 16.

The boom is intended to be towed slowly through the area over which the oil pollution extends. For this purpose the tow lines 12 are connected to a beam (not shown) supported horizontally and preferably a little above the surface of the sea with the axis of the beam lying transverse to the centre line of a ship. The beam is preferably supported on a superstructure, preferably made of light metals, carried on the deck of the ship which projects for an adequate distance, for example 20 or 30 feet, in front of the bows of the ship. It would be possible to tow the boom by supporting the beam above the sea behind the stern of the ship but in that case, not only would the ship have to sail through the polluted area but the passage of the ship and the disturbance created by the propellers at the rear of the ship would disturb the oil film and, to a cretain extent, disperse it so that the boom would be less effective. Accordingly, the preferred arrangement is to mount this superstructure at the bow end of the ship. Ideally, the ship would have a square front in place of the normal pointed bow. The superstructure may, if desired, be made retractable.

Figure 2:
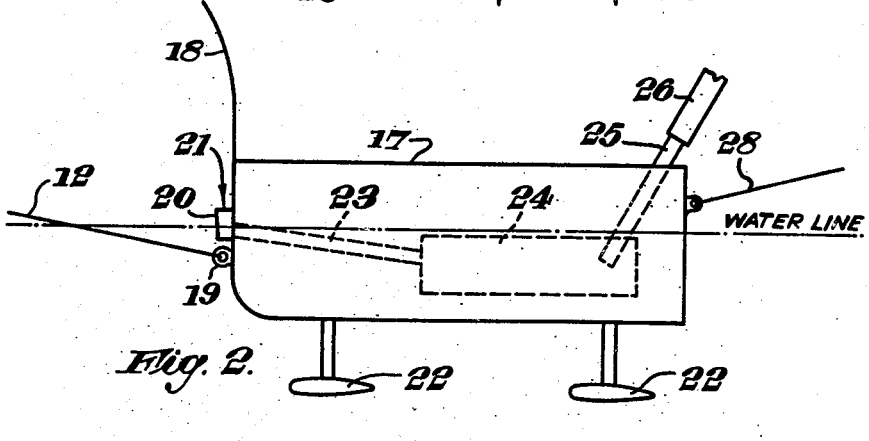
FIGURE 2 is a vertical section on the longitudinal centre line of one of the buoyancy chambers making up the boom shown in FIGURE 1.

FIGURE 2 is a vertical section on the longitudinal centre line of one of the buoyancy chambers 11 or 15. The chamber comprises an outer sealed body 17 with a curved upwardly projecting shield 18 at the forward end to reduce the possibility of water and oil passing right over the top of the unit so that some oil would escape collection. A little below the water line is the anchorage 19 for the tow line. Ideally, the buoyancy chambers are just drawn forward without an upward or downward bias to the traction force but this may be difficult to achieve and if the beam is held a small distance above the surface of the sea the angle of the upward tilt of the cable connected to the anchorage 19 need not be very large. The height of the beam may be made variable or it might even be allowed to float. Projecting outwardly from the buoyancy chamber is a lip 20 the top of which is a little above the water line. The lip 20 and the front end of the casing 17 of the chamber define a slot 21 through which the surface oil and a certain amount of sea water are taken into the buoyancy chamber as the chamber is pulled forward through the water. The general shape of the front wall of the buoyancy chamber and the arrangement of the lip 20 and its distance above the water line are such that when the chamber is being towed at the designed speed the water will escape comparatively easily below the buoyancy chamber while the oil will resist being dragged down below the chamber and the layer of oil on the surface will become locally thickened immediately in front of the lip 20 until it builds up and overlaps the lip and runs into the slot 21. It is appreciated that the idealized description given above of the action of the lip 20 will not be fully realised in practice but the arrangement is intended to ensure that the oil/water ratio entering the slot 21 in maintained as high as possible. Variations in the shape and arrangement shown are, of course, possible within the scope of the invention.

In order to secure the maximum efficiency in operation it is important to maintain the vertical position of the buoyancy chamber as constant as possible in relation to the water surface even when this surface is undulating and heaving. For this purpose hydroplanes 22 may be fitted below each buoyancy chamber. Moreover, to counteract any upward movement of the buoyancy chamber due to the pull of the tow line on the anchorage 19, the anchorage 19 may be mounted, as shown at 19a in FIGURE 3, on a movable lever 29 which, against a suitable resilient member such as a spring 30, may be arranged to tilt the front hydroplane to some extent so that if a heavy pull is exerted on the anchorage 19a, the lever arrangement tilts the front hydroplane, indicated at 22a downwardly to counteract the upward component of the pull by the tow line. Alternatively or additionally, the shield 18 may be made moveable to a limited extent and also provided with resilient means and a suitable linkage so that if the shield 18 is subjected to appreciable water pressure it will tilt the front hydroplane 22 upwardly, so that the buoyancy chamber is maintained at all times, as far as possible, in its intended position in relation to the water level.

Figure 3:
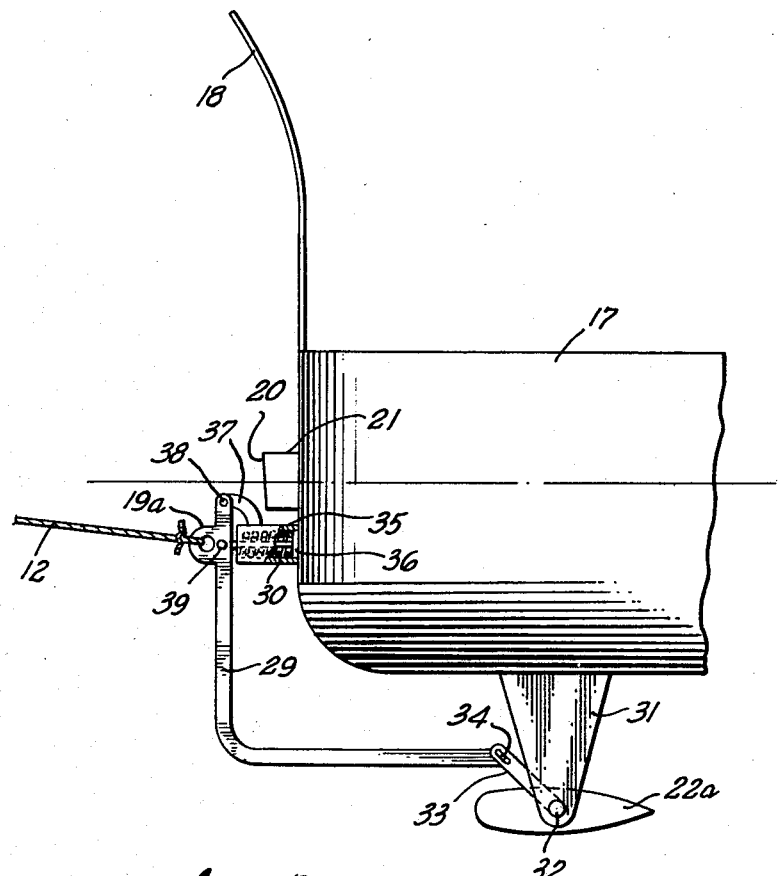
FIGURE 3 shows a mechanical linkage containing a lever for tilting a hydroplane carried underneath a buoyancy chamber.

The arrangement of FIGURE 3 shows the buoyancy chamber 17, the shield 18, the lip 20 and the slot 21.

The hydroplane 22a is carried on a shaft 32 so that it may be tilted. The shaft is supported in brackets 31 and an arm 33 is fixed to the shaft 32 for tilting the hydroplane. A lever 29 has at its one end a pin 34 engaging a slot in the arm 33 and the other end of the lever is supported on a fulcrum pin 38 carried on a fixture 37 which also houses the spring 30. A bolt 36 has a head which engages one end of the spring 30 and the other end of the bolt is linked with the lever 29 by a pin 39. If the pull on the towline 12 should exceed a certain level then the spring 30 yields and the lever 29 tilts the hydroplane 22a through the medium of the pin 34.

The mixture of oil and water entering the slot 21 passes along a sealed duct 23 in the buoyancy chamber to a sealed collecting chamber 24 which is on a lower level than the lip 20. A rigid pipe 25 leads to a connection with a light flexible pipe 26. Since the water and the oil will "pile up" to a certain extent in front of the lip 21, due to the fact that the buoyancy chamber is being towed, forwardly projecting guards 27 (FIGURE 1) are preferably fitted to the end buoyancy chamber to minimize the loss of oil around the sides thereof.

The flexible pipes 26 from all the buoyancy chambers are supported at intervals by the beam aforementioned or superstructure and lead to suction pumps on the ship. Positive pumps must be used since air may enter the collecting chambers with the oil and water, and the height of the pumps must be limited to the distance through which atmospheric pressure will "lift" the mixture. From the pumps the mixture is led to centrifuging machinery in which the oil and water are separated. The water is discharged from the stern of the ship while the oil passes to tanks in the ship.

Assuming that the ship proceeds at a very slow speed of two (land) miles per hour, that the layer of oil is only one thirtysecond part of an inch thick, that the boom is sixty feet long and that it is successful in collecting all the oil in the channel swept, the area covered in one hour is $5280 \times 2 \times 60 = 633,600$ square feet and the volume of oil collected is $$\frac{633,600}{12 \times 32} = 1,650 \text{ cubic feet}$$

Assuming that a cubic foot of water weighs 62.5 lbs. and that the specific gravity of the oil is 0.85 the weight of oil collected is $$\frac{1650 \times 62.5 \times 0.85}{2240} = 39 \text{ tons}$$

in one hour or 936 tons in a twenty-four hour working day.

With a higher speed and/or a longer boom and/or a thicker layer of oil the "output" of oil will be much higher.

Assuming that the mixture collected consists of only 10% oil and 90% water by volume, then the pumping machinery and the centrifuging machinery must be capable of dealing with about 450 tons of mixture per hour or about 11,000 tons in twenty-four hours.

While the crude oil may contain small amounts of water soluble elements which would disappear and certain light elements which might evaporate to some extent, while the oil is exposed on the surface of the sea, the oil collected will be fit for salvage and it may be transferred from time to time from the "sweeping" ship to a tanker proceeding alongside.

I claim:
1. Apparatus for collecting light liquid, such as oil, from the surface of a body of water, such as the sea, comprising a boom made up of a number of buoyancy chambers, flexible couplings coupling the buoyancy chambers together so that they may move in all directions with respect to each other except laterally towards and away from each other, flexible shields between adjacent buoyancy chambers to inhibit escape of light liquid between them, each buoyancy chamber being made up of an outer sealed chamber, an inner collecting chamber sealed from the outer chamber, means on the buoyancy chamber by which it may be towed, a lip projecting outwardly from the front of the buoyancy chamber to define a horizontal slot, a duct sealed from the outer chamber connecting the slot to the inner chamber, the front wall of the buoyancy chamber being shaped to allow water to escape easily below the buoyancy chamber when the buoyancy chamber is being towed, the lip being set at such a height above the water level that when the buoyancy chamber is being towed at a predetermined speed the water escapes and the light liquid builds up in front of the lip until it overlaps it and flows through the duct into the collecting chamber with a minimum of water, and means for drawing the collected liquid from the collecting chamber.

2. Apparatus as claimed in claim 1 comprising at least one hydroplane beneath each buoyancy chamber, means for tiltably supporting at least one hydroplane of each buoyancy chamber, a movable lever upon which the means for towing the buoyancy chamber is carried, and a spring to resist the towing force, so arranged that when the towing force exceeds a predetermined limit the spring yields and the lever tilts the hydroplane downwardly to prevent the buoyancy chamber from being lifted in response to the towing force.

3. Apparatus as claimed in claim 1 comprising control lines attached to the rear ends of the buoyancy chambers.

4. Apparatus as claimed in claim 1 comprising shields at the front ends of the buoyancy chambers to prevent liquid from washing over the tops of the buoyancy chambers.

5. Apparatus as claimed in claim 1 comprising forwardly projecting guards fitted to the end buoyancy chambers to minimise loss of light liquid around the sides of the boom.

References Cited
UNITED STATES PATENTS

| | | | |
|---|---|---|---|
| 2,957,579 | 10/1960 | McCombie | 210—242 |
| 2,967,503 | 1/1961 | Unger | 114—126 X |
| 3,176,644 | 4/1965 | Thomas et al. | 114—126 |
| 3,219,190 | 11/1965 | Thune | 114—0.5 X |

TRYGVE M. BLIX, Primary Examiner

U.S. Cl. X.R.

210—242